Oct. 30, 1928.
F. W. YELLS
1,689,417
VEHICLE LOADING DEVICE
Filed May 3, 1927
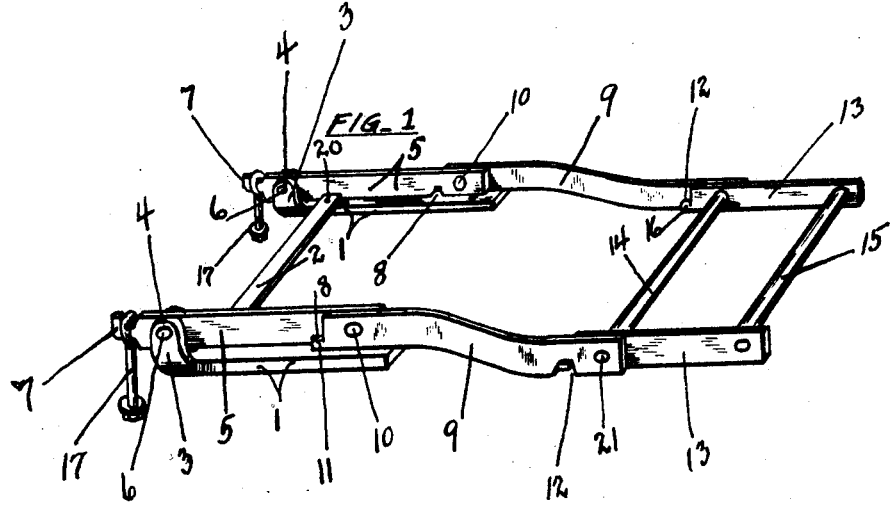
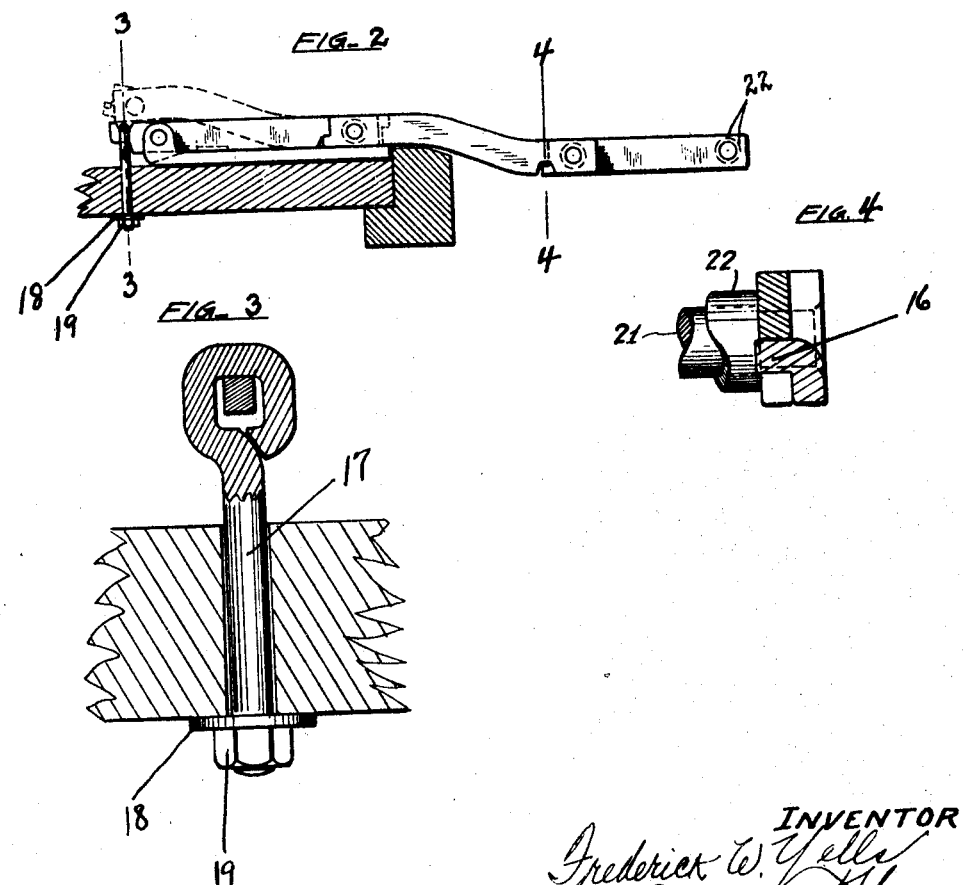
INVENTOR
Frederick W. Yells
BY Denison & Thompson
ATTORNEYS.

Patented Oct. 30, 1928.

1,689,417

UNITED STATES PATENT OFFICE.

FREDERICK W. YELLS, OF GENEVA, NEW YORK.

VEHICLE LOADING DEVICE.

Application filed May 3, 1927. Serial No. 188,462.

This invention relates to a new and improved method for loading and unloading a hearse or other vehicle.

The main object of my invention is to provide a means whereby the load may be supported beyond the rear end of the vehicle, thereby enabling the handlers to load and unload the vehicle with much greater ease and much less danger of the load being precipitated to the ground during the operation.

Another object is to provide a means whereby the support may be easily placed within the vehicle in a compact form.

Other objects and advantages relate to the details of form and structure of the device, all as will more fully appear from the following description, taken in connection with the accompanying drawings, in which:

Figure 1 is a perspective view of my device in operating position.

Figure 2 is a side view showing in dotted lines the position of the device when folded into the vehicle.

Figure 3 is a section, partially in elevation, on line 3—3, Figure 2.

Figure 4 is a section on line 4—4 of Figure 2.

In the drawings like numbers refer to like parts.

My device may be made of iron or steel or any other material of sufficient strength, and may be finished in any desired manner after fabrication. It consists of two bed-plates —1, 1— joined together by strap —2— affixed thereto in any well known way as by rivets —20—. The rear ends of the bed-plates —1, 1— are formed into yokes —3, 3— extending upwardly and at substantially right angles to the upper sides of bed-plates —1, 1—. The upper ends of yokes —3, 3— are provided with rivet holes —4, 4—.

The rear section of my device is formed of two side-bars —5, 5— which, near their rearward ends, are respectively pivoted into yokes —3, 3— by means of pivot pins —6, 6— secured in yokes —3, 3— by any convenient means, as riveting. The rear ends of side bars —5, 5— are fashioned into upwardly extending hooks —7, 7—. Notches —8, 8— are provided in side plates —5, 5— on the bottom thereof and near their forward ends.

The middle section is formed of two side plates —9, 9— fashioned with a reverse curve so that the forward ends will be slightly lower than the rear section when in correct relative position thereto. The rear ends of side plates —9, 9— are pivotally connected respectively to the front ends of side-plates —5, 5— on the outer sides thereof by any convenient means, such as rivets —10, 10— and carry on the bottom of their rear ends tongues —11, 11— which extend inwardly through notches —8, 8—. The forward ends of side plates —9, 9— are provided with notches —12, 12— in their bottom edges.

The front section is formed of two side plates —13, 13— pivotally connected respectively on the inner sides of the front ends of side plates —9, 9— by means of cross-roll —14—.

The forward ends of side plates —13, 13— are fastened together by cross-roll —15— which is similar in size and shape to cross-roll —14—. Both cross-roll —14— and cross-roll —15— are formed with rollers —22—, which function as spacers between the two side plates —13, 13—, and which are carried on shafts —21—. The side plates —13, 13— carry on the bottom of their rear ends tongues —16, 16— which extend outwardly through notches —12, 12—.

Eye-bolts —17, 17— are placed in position in the floor of the vehicle and secured against upward movement by means of washers —18, 18— and nuts —19, 19—. Eye-bolts —17, 17— are of the proper length and size to receive hooks —7, 7— in a loose fit and are properly positioned so that the front edges of bottom plates —1, 1— will rest on the rear edge of the floor of the vehicle.

In operation my device functions as follows:

The hooks are inserted in the eye-bolts and the bottom plates placed in position on the floor of the vehicle. The forward section is rotated about the middle section until the tongues —16, 16— engage the notches —12, 12—. Similarly the middle section is rotated about the rear section until the tongues —11, 11— engage the notches —8, 8—. The front section is then lowered until it rests on the bottom plates and further downward movement is then impossible.

The device is so designed that when it is in the just described loading position, which can perhaps best be seen in Figure 1, the top edges of the rollers —14, 15— are in a plane with the floor of the vehicle, or the top edges of rollers, if any be positioned in the floor of the vehicle.

When the loading has been accomplished and it is desired to close the rear door of the vehicle, the front section of the device is rotated about the middle section until their respective side plates are approximately parallel. Similarly, the middle section carrying the front section, is rotated about the rear section until the device rests on the bottom plates. The device is so designed that in the last described position it is entirely within the body of the vehicle, as may perhaps best be seen from the dotted lines of Figure 2.

If it is desired, the device may then be unhooked from the eye-bolts and the device set to one side.

Although I have shown and described a specific construction, form and arrangement of parts, I do not desire to restrict myself to the details of the same, as various changes may be made within the scope of the appended claims.

I claim:

1. In a device of the class described, a base section, a rear section pivotally mounted thereon, an intermediate section pivotally mounted on said rear section, a front section pivotally mounted on said intermediate section, means attached to the vehicle for locking said sections one to the other in longitudinal alignment and in substantially the plane of the floor of the vehicle, means for removably affixing said rear section to the floor of a vehicle, and means for folding said sections one upon the other.

2. In a device of the class described, a rear section, an intermediate section pivotally mounted thereon, a front section pivotally mounted on said intermediate section, means attached to the vehicle for locking said sections in longitudinal alignment and in substantially the plane of the floor of the vehicle, and means for removably affixing said rear section to the floor of a vehicle.

3. In a device of the class described, a rear section, an intermediate section pivotally mounted thereon, a front section pivotally mounted on said intermediate section, means attached to the vehicle for locking said sections in longitudinal alignment and in substantially the plane of the floor of the vehicle, means for removably affixing said rear section to the floor of a vehicle, and means for tiering said sections on said vehicle floor.

4. In a device of the class described, a movable support, means for moving the support to and from the rear end of a vehicle floor, and means attached to the vehicle and cooperating with the support for supporting the upper surface of the support in substantially the plane of the vehicle floor, such means constituting the sole supporting means for the support.

5. In a device of the class described, a support movable to and from the rear end of a vehicle floor, and means attached to the vehicle and cooperating with the support for supporting the upper surface of the support in substantially the plane of the vehicle floor, such means constituting the sole supporting means for the support.

In witness whereof I have hereunto set my hand.

FREDERICK W. YELLS.